(No Model.)

H. MAYERS.
ICE CREAM FREEZER.

No. 487,370. Patented Dec. 6, 1892.

Witnesses:
S. Isaacs
A. M. Charlot

Inventor:
Henry Mayers
By Smith & Osborn

UNITED STATES PATENT OFFICE.

HENRY MAYERS, OF SAN FRANCISCO, CALIFORNIA.

ICE-CREAM FREEZER.

SPECIFICATION forming part of Letters Patent No. 487,370, dated December 6, 1892.

Application filed September 15, 1891. Serial No. 405,787. (No model.)

*To all whom it may concern:*

Be it known that I, HENRY MAYERS, a citizen of the United States, residing in the city and county of San Francisco, State of California, have invented certain new and useful Improvements in Ice-Cream Freezers, of which the following is a specification.

My invention relates to that class or variety of ice-cream freezers in which a cylinder containing the freezing agent is revolved in the liquid to be frozen and the frozen cream as it forms on the exterior surface of the cylinder is removed by a scraper.

The improvements comprising this invention consist, first, of a self-adjusting cream pan or receptacle holding the liquid to be frozen, in combination with the freezing-cylinder, by which the cylinder is kept immersed at uniform depth in the liquid while the operation is going on; secondly, of a receptacle within the freezing-cylinder surrounded by the freezing agent for storing the frozen cream and keeping it in solid condition until required for use; thirdly, of a means or attachment by which the machine can be used to make champagne-frappé, and, finally, in the novel construction and combination of parts, as hereinafter described, producing an improved freezer of the kind before mentioned.

The nature of the improvements and the manner in which I have constructed and applied the same will be understood from the following description and the drawings that accompany and form part of this specification.

Figure 1:
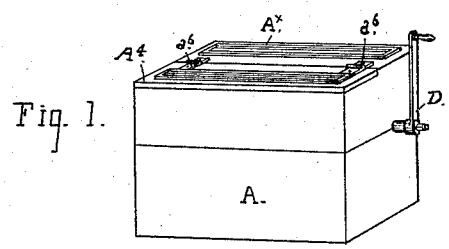
Figure 2:
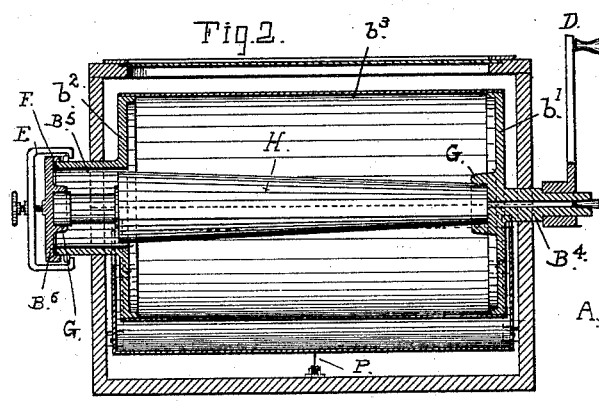
Figure 3:
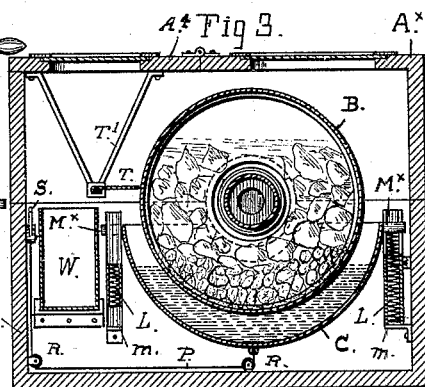
Figure 4:
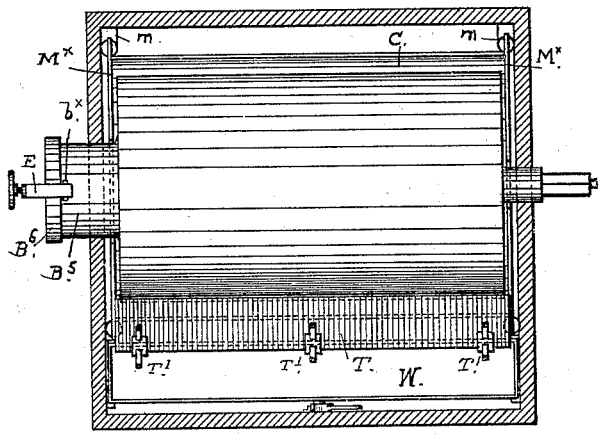
Figure 5:
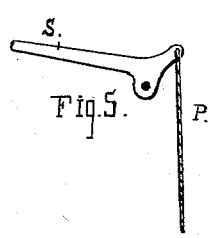

Figure 1 is an outside view in perspective of my improved freezer. Fig. 2 is a vertical section taken longitudinally through the freezing-cylinder, cream-pan, and outside case. Fig. 3 is a vertical cross-section. Fig. 4 is a top view of the freezing-cylinder, scraper, and receptacles for the liquid to be frozen and the frozen cream. Fig. 5 is a detail view of the lever for drawing down the cream-pan.

A indicates a case or box inclosing the operating parts.

B is the freezing-cylinder, and C is the pan or trough holding the cream or liquid to be frozen.

The cylinder has cast-metal heads $b'$ $b^2$ and a sheet-metal body $b^3$. One head is solid and has a hollow trunnion or journal $B^4$, with a square portion on the end to take a crank D on the outside, and the other head has an opening surrounded by a neck or standing rim $B^5$, with a cap or cover $B^6$ fitted to the end to close the opening. This cover is held in place by a screw and clamp E, and a tight joint is obtained by a rubber washer or packing-ring F in the cover. The aperture through the trunnion affords an outlet for discharging the water from the cylinder and is fitted with a plug. On the inside face of the cover and in the center of the opposite solid head on the inside of the cylinder are sockets formed of a ring or standing projection G. These sockets are in line with the axis of the cylinder and are of suitable size and depth to take the ends of a small cylinder or can H, which is inserted into the freezing-cylinder through the aperture in the head $b^2$ and is of suitable length to set into these supports. The office and purpose of this cylinder is to receive the frozen cream from time to time as it is taken from the freezing-cylinder and to preserve it in a solid or firm condition until such time as it is to be served. This receptacle is removable from the freezing-cylinder, but the frozen cream can be put into it through the opening in the end without withdrawing it from the cylinder. The cap or cover to close this opening is held by the head or cap of the freezing-cylinder, and access to the inner receptacle is had by slipping off the clamp from the lugs $b^\times$ on the neck of the cylinder and taking off the cap. I have termed this receptacle the "storage-cylinder," as its office is to receive the frozen cream and keep it under the influence of the freezing agent in the surrounding cylinder without interfering with the operation of the machine. The same charge of ice or freezing mixture therefore serves to freeze the cream and to keep the frozen cream from growing soft or melting after it is made. As the freezing operation is quite rapid, it requires but a few minutes to freeze the wine, and the storage-cylinder can be filled with frozen cream and replaced after the bottle is taken out without interrupting the work.

The pan $c$ to hold the cream or liquid in contact with the freezing-cylinder has bottom and sides conforming to the curve of the cylinder, but of greater radius than the cylinder to leave sufficient space for the liquid beneath and on the sides of the cylinder. Yielding supports for the pan are formed of coil-springs L in slotted tubular guides m, and on these rest arms or projections M on the sides of the pan, one at each corner, so that the weight of the pan and its contents is borne by the springs. This manner of mounting the pan makes it self-adjusting with reference to the surface of the cylinder, by which means the immersion of the cylinder is kept uniform during the whole operation and until all the liquid is taken up by the freezing operation.

The springs are adjusted according to the weight of the pan and the quantity of cream or liquid which the pan when filled and ready for operation is to hold, and then as the contents are taken up and frozen on the cylinder the pan rises by virtue of the decrease in the weight, so that the bottom of the pan is brought nearer to the cylinder, and this adjustment or elevation of the pan takes place continually as the operation goes on until all the cream is frozen.

The guide-tubes are fixed in the case and are slotted to take the arms on the rim of the pan. The springs L sit in the tubes and the arms rest on them.

To draw the pan away from the freezing-cylinder for convenience in filling the pan or to hold it farther from the cylinder at the beginning of the work, as may sometimes be found necessary, I attach a cord P to the bottom of the pan and then bring it to the front and upward to a hand-lever S through pulleys R R. The lever is located inside the case at the point where it can be reached readily, and by turning it around one-half a circle it draws the pan down to the bottom of the case.

The scraper T is fixed in brackets or hangers T', attached to the under side of the hinged lid $A^4$, and it is held by these parts against the surface of the cylinder. By this construction the scraper is pressed against the cylinder and is drawn away, according as the lid $A^4$ is pressed down or is raised. The lid is attached to the top of the case by hinges $a^6 a^6$, and the hangers are fixed rigidly to the under side. This lid is a movable part of the top of the case A or of a cover $A^*$, which is itself attached to the body of the case by hinges at the back. Access is had to the parts inside by turning back this upper hinged section $A^*$. The hinged lid $A^4$ therefore furnishes a means of adjusting contact of the scraper with the surface of the cylinder to scrape lightly or closely without opening the case. A glass is inserted in this lid, through which the working of the scraper can be inspected from time to time.

A receiving pan or vessel W is placed in front of the case beneath the scraper, and into this receptacle the frozen cream is deposited from the back edge of the scraper. The pan is removable, and the frozen cream is taken from it to be placed in the storage-cylinder or served at once.

Having thus fully described my invention, what I claim, and desire to secure by Letters Patent, is—

1. In an ice-cream freezer of the kind having a revoluble freezing-cylinder, the combination of a suitable inclosing case, the revoluble cylinder mounted for rotation in said case, having an interior space for the freezing agent, a neck or portion on one end of reduced diameter extending through the case to the outside, a storage cylinder or receptacle for the frozen cream insertible into and removable from the freezing-cylinder through its neck, and a cap closing said opening, constructed for operation as specified.

2. In an ice-cream freezer, the combination, with the freezing-cylinder mounted for rotation within a casing in a cream-holding pan and having an opening in one end for introducing the freezing agent, of the inner reservoir insertible and removable through said opening, the support G for one end of said reservoir in the head of the freezing-cylinder, and the cap closing the freezing-cylinder and forming a support for the other end of the reservoir within the cylinder, substantially as described.

3. In an ice-cream freezer, the combination, with a revoluble freezing-cylinder, of a casing within which the freezing-cylinder is mounted for rotation, having a hinged outwardly-movable lid forming part of the top of the casing, and a scraping-blade suspended from the under side of said lid by rigid hangers, substantially as described.

In testimony that I claim the foregoing I have hereunto set my hand and seal.

HENRY MAYERS. [L. S.]

Witnesses:
EDWARD E. OSBORN,
SIMON B. ISAACS.